US011587274B2

(12) United States Patent
Ma et al.

(10) Patent No.: US 11,587,274 B2
(45) Date of Patent: Feb. 21, 2023

(54) TIME CODE DISPLAY SYSTEM AND METHOD, DISPLAYING DEVICE, STORAGE MEDIUM AND ELECTRONIC APPARATUS

(71) Applicant: BOE Technology Group Co., Ltd., Beijing (CN)

(72) Inventors: Xitong Ma, Beijing (CN); Lihua Geng, Beijing (CN); Ran Duan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/515,178

(22) Filed: Oct. 29, 2021

(65) Prior Publication Data

US 2022/0303493 A1 Sep. 22, 2022

(30) Foreign Application Priority Data

Mar. 18, 2021 (CN) .......................... 202110293006.2

(51) Int. Cl.
*H04N 5/06* (2006.01)
*H04N 5/46* (2006.01)
*G06T 11/60* (2006.01)
*G09G 5/00* (2006.01)
*G09G 5/377* (2006.01)

(52) U.S. Cl.
CPC .............. *G06T 11/60* (2013.01); *G09G 5/006* (2013.01); *G09G 5/377* (2013.01); *G09G 2360/18* (2013.01)

(58) Field of Classification Search
CPC ........ G06T 11/60; G09G 5/006; G09G 5/377; G09G 2360/18
See application file for complete search history.

(56) References Cited

U.S. PATENT DOCUMENTS 6,067,653 A * 5/2000 Tsukagoshi ........ H04N 21/4884
714/704
2011/0173654 A1 7/2011 Todo et al.
(Continued)

FOREIGN PATENT DOCUMENTS

CN 102131105 A 7/2011
CN 102724560 A 10/2012
(Continued)

OTHER PUBLICATIONS

CN202110293006.2 first office action and search report.

*Primary Examiner* — Bryan Earles
(74) *Attorney, Agent, or Firm* — IPro, PLLC

(57) ABSTRACT

A time code display system comprising: a video receiver configured for receiving a plurality of non-homologous video signals; a time code parser connected with the video receiver and configured for extracting time code data of each video frame from each video signal; a write controller and a buffer, the write controller being connected with the video receiver and the time code parser; a synchronous clock component configured for generating a local clock signal according to a channel associated clock signal of any video signal; and a read controller and a display, the read controller being connected with the synchronous clock component and the buffer and configured for reading out the video frame of each video signal and the time code data corresponding to the video frame from the buffer at the same time, according to the local clock signal.

14 Claims, 7 Drawing Sheets

(56) References Cited

U.S. PATENT DOCUMENTS

2013/0094698 A1* 4/2013 Laksono .......... H04N 21/44008
  382/103
2019/0199890 A1   6/2019 Saito et al.

FOREIGN PATENT DOCUMENTS

| CN | 103188473 A | 7/2013 |
| CN | 103686039 A | 3/2014 |
| CN | 104780329 A | 7/2015 |

* cited by examiner

TIME CODE DISPLAY SYSTEM AND METHOD, DISPLAYING DEVICE, STORAGE MEDIUM AND ELECTRONIC APPARATUS

The application claims priority to Chinese Patent Application No. 202110293006.2 filed in the China National Intellectual Properly Administration on Mar. 18, 2021, and a title of "TIME CODE DISPLAY SYSTEM AND METHOD, DISPLAYING DEVICE, STORAGE, MEDIUM AND ELECTRONIC APPARATUS", the entire contents of which are hereby incorporated by reference.

TECHNICAL FIELD

The disclosure relates to the technical field of display control, in particular to a time code display system and method, displaying device, a storage medium and electronic apparatus.

BACKGROUND

A time code is a code recorded for each frame of image when a camera records image signals, and is a digital signal applied to streaming, which assigns a number to each frame in a video to represent hours, minutes, seconds and frame numbers. Traditional monitor display systems store time codes and video frames separately, and the time codes are output in a delayed manner according to the number of cache frames of the video in a memory, or according to the way of frame rate conversion.

SUMMARY

The disclosure provides a time code display system and method, displaying device, a storage medium and electronic apparatus.

An embodiment of a first aspect of the disclosure provides a time code display system, comprising:

a video receiver configured for receiving a plurality of non-homologous video signals;

a time code parser connected with the video receiver and configured for extracting time code data of each video frame from each video signal;

a write controller and a huller, the write controller being connected with the video receiver and the time code parser, and the write controller being configured for writing each video frame in each video signal and corresponding time code data into the buffer;

a synchronous clock component connected with the video receiver and configured for generating a local clock signal according to a channel associated clock signal of any video signal; and a read controller and a display, the read controller being connected with the synchronous clock component and the huller and configured for reading out the video frame of each video signal and the time code data corresponding to the video frame from the buffer at the same time, according to the local clock signal, so that the display performs superposition display on the video frame of each video signal and the time code data corresponding to the video frame.

According to an embodiment of the disclosure, clock domains of the plurality of the non-homologous video signals are not completely the same, and the write controller is further configured for writing each video frame in the corresponding video signal and the time code data thereof into the buffer under the clock domain of each said video signal.

According to an embodiment of the disclosure, the time code data comprise a time code state and a time code value, and the write controller is further configured for reading the time code value from the time code parser when it is detected that the time code state is a valid state.

According to an embodiment of the disclosure, the write controller is further configured for writing display data of each video frame into the buffer line by line, and writing the time code value before a start line of the display data of the video frame when writing the time code value.

According to an embodiment of the disclosure, an output frame rate of the read controller is the same as an input frame rate of any video signal.

According to an embodiment of the disclosure, the read controller is further configured for, when reading out other video signals from the buffer, performing frame copy operation on the other video signals if an input frame rate of the other video signals is less than the output frame rate of the read controller; or performing frame dropping operation on the other video signals if the input frame rate of the other video signals is greater than the output frame rate of the read controller.

According to an embodiment of the disclosure, the synchronous clock component comprises: a synchronization unit configured fir generating a frame synchronization pulse signal of a channel associated clock domain according to the channel associated clock signal of any video signal; a clock domain conversion unit connected with the synchronization unit and configured for converting the frame synchronization pulse signal of the channel associated clock domain into a frame synchronization pulse signal of a local clock domain; and a timing generation unit connected with the clock domain conversion unit and configured for converting the frame synchronization pulse signal of the local clock domain into the local clock signal.

According to an embodiment of the disclosure, the read controller is further configured for reading display data of a preset display picture according to standard timing when it is detected, by the synchronous clock component, that no video signal is input into the video receiver.

According to an embodiment of the disclosure, further comprising an OSD menu generation component connected with the read controller, wherein the OSD menu generation component is configured for generating OSD menu data according to the time code data, so that the read controller controls the display to display the OSD menu data.

According to an embodiment of the disclosure, further comprising a superposition component and a video output component, wherein the superposition component is connected with the read controller and the OSD menu generation component, and configured for generating a superposition picture of a video frame picture and the time code data according to the video frame and the OSD menu data; and the video output component is connected with the superposition component, and configured for outputting the superposition picture.

According to an embodiment of the disclosure, the video receiver comprises a plurality of video receiving units, and each said video receiving unit is configured for receiving a video signal; the time code parser comprises a plurality of time code analysis units, each said time code analysis unit is connected with one said corresponding video receiving unit, and each said time code analysis unit is configured for extracting time code data corresponding to each video frame from the corresponding video signal; and the write controller comprises a plurality of write control units, each said write control unit is connected with one said corresponding video receiving unit and one said corresponding time code analysis unit, and each said write controller is configured for writing the video frame in the corresponding video signal and the corresponding time code data into the buffer.

According to an embodiment of the disclosure, further comprising a bus arbitration component and a read-write controller, wherein one end of the bus arbitration component is connected with the read controller and the write controller, and the bus arbitration component is configured for receiving a write data request sent by the write controller or a read control request sent by the read controller and coordinating the write control request with the read control request; and one end of the read-write controller is connected with another end of the bus arbitration component, another end of the read-write controller is connected with the buffer, and display system according to claim 1, further comprising a bus arbitration component and a g to the write control request or reading data from the buffer according to the read control An embodiment of a second aspect of the disclosure provides display equipment comprising the above time code display system.

An embodiment of a third aspect of the disclosure provides a time code display method, comprising: receiving multiple non-homologous video signals; extracting time code data of each video frame from each video signal; writing each video frame in each video signal and corresponding time code data into the buffer; generating a local clock signal according to a channel associated clock signal of any video signal; and reading out the video frame of each video signal and the time code data corresponding to the video frame from the buffer at the same time, according to the local clock signal, so that the display performs superposition display on the video frame of each video signal and the time code data corresponding to the video frame.

An embodiment of a fourth aspect of the disclosure provides a nonvolatile computer readable storage medium, having a time code display program stored thereon, wherein when the computer readable storage medium is executed by a processor, the above time code display method is implemented.

An embodiment of a fifth aspect of the disclosure provides an electronic apparatus, comprising a memory, a processor, and a time code display program stored in the memory and operable on the processor, wherein when the processor executes the time code display program, the above time code display method is implemented.

An embodiment of a sixth aspect of the disclosure provides a computer program product, comprising a computer-readable code, and when the computer-readable code is executed on an electronic apparatus, causing the electronic apparatus to implement the above time code display method.

Additional aspects and advantages of the disclosure will be set forth in part in the description that follows, and in part will be obvious from the description that follows, or may be learned by practice of the disclosure.

BRIEF DESCRIPTION OF THE DRAWINGS

In order to explain the technical solution in the embodiments of the disclosure or the prior art more clearly, the drawings used in the description of the embodiments or related arts will be briefly introduced below. Obviously, the drawings in the following description are only some embodiments of the disclosure, and for those of ordinary skill in the art, other drawings can be obtained according to these drawings without paying creative labor.

DETAILED DESCRIPTION

Figure 1:
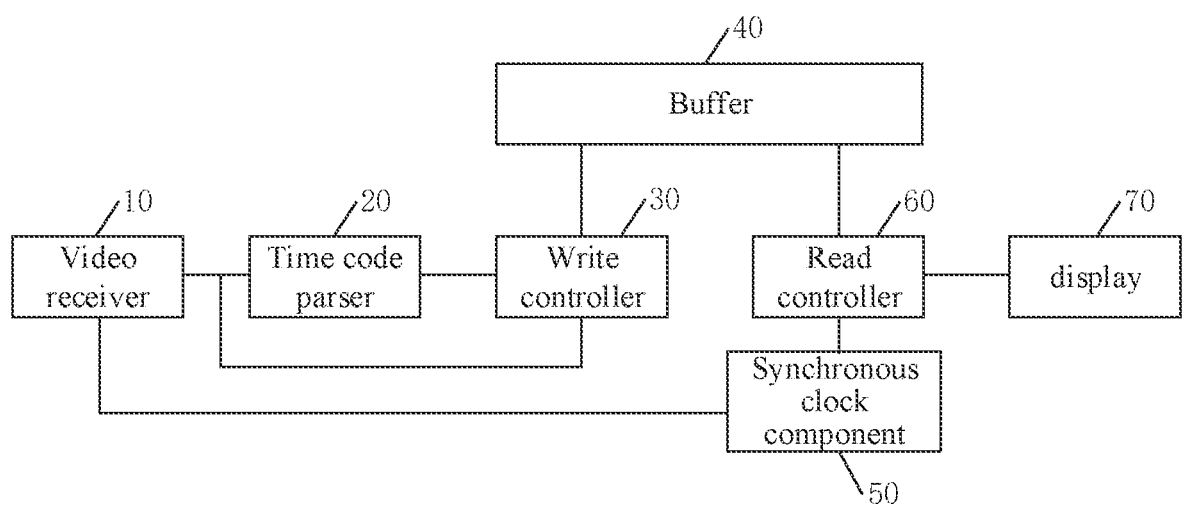
FIG. 1 is a structural block diagram of a time code display system according to an embodiment of the disclosure.

Embodiments of the disclosure are described in detail below, examples of which are shown in the accompanying drawings, in which identical or similar reference numerals denote identical or similar elements or elements having identical or similar functions throughout. The embodiments described below with reference to the drawings are exemplary and are intended to explain the disclosure, but cannot be understood as limiting the disclosure A time code display system and method, displaying device, a computer readable storage medium and electronic apparatus proposed by the embodiments of the disclosure are described below with reference to the drawings.

In this application, as shown in FIG. 1, the time code display system comprises a video receiver 10, a time code parser 20, a write controller 30, a buffer 40, a synchronous clock component 50, a read controller 60 and a display 70, wherein the video receiver 10 is configured for receiving multiple non-homologous video signals; the time code parser 20 is connected with the video receiver 10 and configured for extracting time code data of each video frame from each video signal; the write controller 30 is connected with the video receiver 10 and the time code parser 20, and the write controller 30 is configured for writing each video frame in each video signal and corresponding time code data into the buffer 40; the synchronous clock component 50 is connected with the video receiver 20 and configured for generating a local clock signal according to a channel associated clock signal of any video signal; and the read controller 60 is connected with the synchronous clock component 50 and the buffer 40 and configured for synchronously reading out the video frame of each video signal and the time code data corresponding to the video frame from the buffer 40 according to the local clock signal, so that the display 70 performs superposition display on the video frame of each video signal and the time code data corresponding to the video frame.

Particularly, the video receiver 10 may be an SDI (Serial Digital Interface) receiver. The SDI receiver may receive multiple non-homologous video signals, each of which is independently input, and no fixed clock and phase relationship exists between the input video signals. In this embodiment, the SDI receiver may adopt the Xilinx IP, and each Xilinx IP is configured for analyzing received serial video data into parallel video data with timing information. Each SDI video stream contains a plurality of video frames, the time code data is embedded in the SDI video stream, and each piece of time code data is configured for correspondingly identifying a video frame. The time code parser 20 is configured for extracting the time code data corresponding to each video frame from the SDI video stream. The write controller 30 is configured for writing each video signal into the buffer 40, and during writing, video frames in the video signals and corresponding time code data thereof are written into the buffer 40 together. The buffer 40 may be a DDR3 cache unit. Of course, the buffer 40 may also be a storage unit of other storage specifications, which is not limited in this application. The synchronous clock component 50 is configured for generating the local clock signal according to the channel associated clock signal of any video signal. Generally, the synchronous clock component 50 can be set to generate the local clock signal according to a received channel associated clock signal of a first video signal, so that the read controller 60 may synchronously read out each input video signal according to the local clock signal. The read controller 60 reads out the time code data bound to the video frames when reading out the video frames from the buffer 40. If the video frame is output as a repeated frame, the corresponding time code data is repeatedly output, and if the video frame is output as a dropped frame, the time code data corresponding to the video frame is dropped too. The read controller 60 synchronously outputs the video frames and the time code data to the display 70, and the display 70 splices multiple non-homologous video display pictures and displays a superposition picture of the video frame of each video signal and the corresponding time code data.

In the time code display system provided in the above embodiment, the video receiver is configured for receiving the multiple non-homologous video signals, the time code parser is configured for extracting time code data of each video frame from each video signal, the write controller is configured for writing each video frame in each video signal and corresponding time code data into the buffer, the synchronous clock component is configured for generating the local clock signal according, to the channel associated clock signal of any video signal, and the read controller is configured for synchronously reading out the video frame of each video signal and the time code data corresponding to the video frame from the buffer according to the local clock signal, so that the display performs superposition display on the video frame of each video signal and the time code data corresponding to the video frame. In this way, the video frames and the time code data are written into the buffer together, and the time code data corresponding to the video frames is read out synchronously when the video frames are read out on an output side, so that the video frames are strictly consistent with the time code data, and the consistency between the time code data and the video frames is ensured whether the frames are dropped, repeated or multiplied on the output side.

Figure 2:
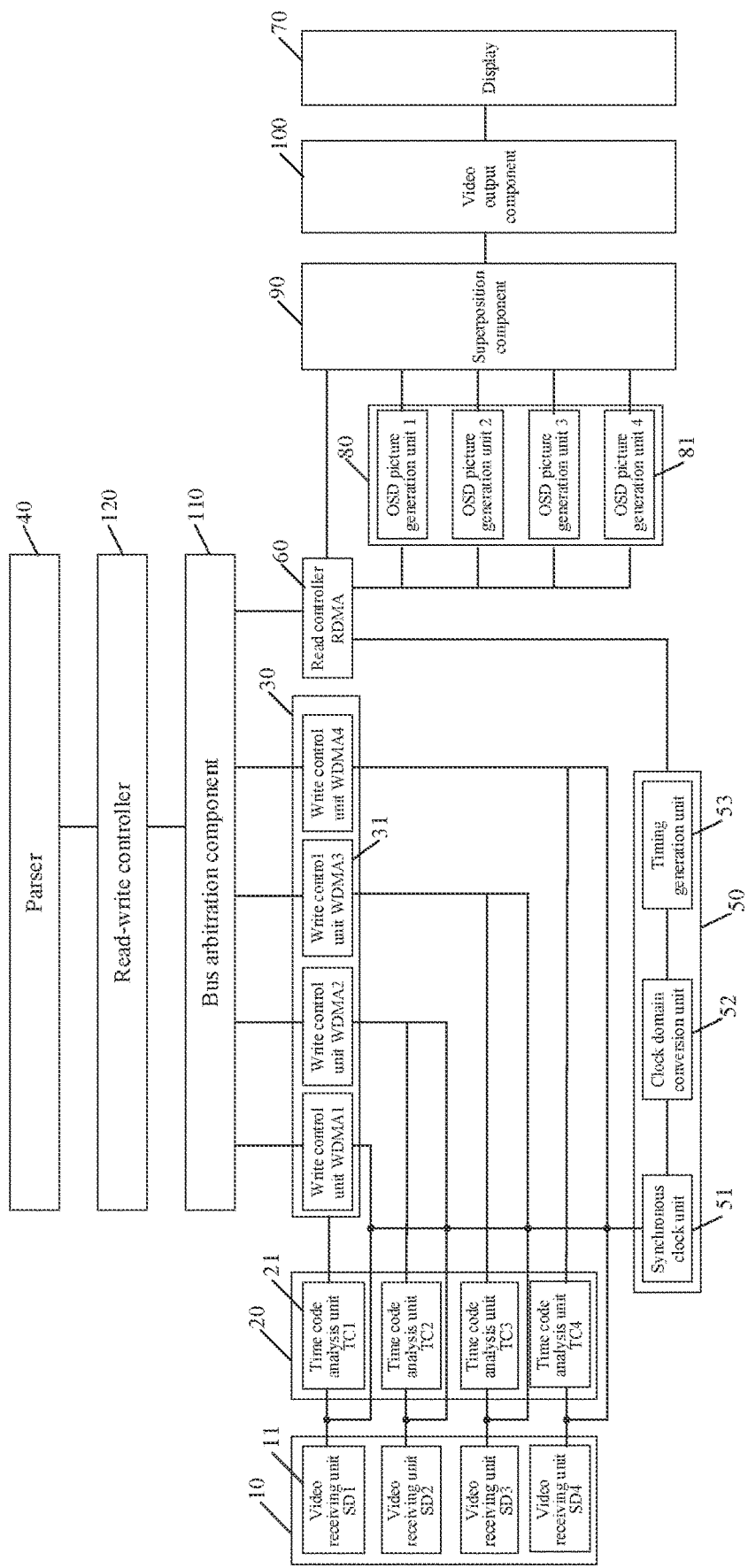
FIG. 2 is a structural block diagram of a time code display system according to another embodiment of the disclosure.

As shown in FIG. 2, in one embodiment, the video receiver 10 comprises a plurality of video receiving units 11, and each video receiving unit 11 is configured for receiving a video signal; the time code parser 20 comprises a plurality of time code analysis units 21, each time code analysis unit 21 is connected with one corresponding video receiving unit 11, and each time code analysis unit 21 is configured for extracting lime code data corresponding to each video frame from the corresponding video signal; and the write controller 30 comprises a plurality of write control units 31, each write control unit 31 is connected with one corresponding video receiving unit 11 and one corresponding time code analysis unit 21, and each write controller 31 is configured for writing the video frame in the corresponding video signal and the corresponding time code data into the buffer 40.

In this embodiment, since the video signals are non-homologous video signals, clock domains of the video signals are not completely the same. The write controller 30 writes each video frame in the corresponding video signal and the time code data thereof into the buffer 40 under the clock domain of each video signal. Specifically, each write control unit 31 is connected with one corresponding video receiving unit 11 and one corresponding time code analysis unit 21. When the video receiving unit 11 receives a video signal, the time code analysis unit 21 extracts the time code data of each video frame from the video signal, and the write control unit 31 writes the video frame and the time code data corresponding to the video frame into the buffer 40 together under the channel associated clock domain of the video signal.

In one embodiment, the time code data contains a time code state and a time code value, and the write controller 30 is further configured for reading the time code value from the time code parser when detecting that the time code state is a valid state.

Specifically, the time code state may be a valid state or an invalid state. When reading the time code data from the corresponding time code analysis unit 21, each write control unit 31 first determines whether the time code state is a valid state, when the time code state is an invalid state, the write control unit 31 does not read the time code value, and when the time code state is a valid state, the write control unit 31 reads the corresponding time code value. The time code value includes values of four flag bits, that is, hours, minutes, seconds and frames, each flag bit is composed of two decimal numbers, and each decimal number is represented by a four-bit binary number, so each time code value is a 32-bit binary number. The time code value information is shown in Table I below.

TABLE 1

| hours | | minutes | | seconds | | frames | |
|---|---|---|---|---|---|---|---|
| [31:28] | [27:24] | [23:20] | [19:16] | [15:12] | [11:8] | [7:4] | [3:0] |
| ten-digit data | unit-digit data | ten-digit data | unit-digit data | ten-digit data | unit-digit data | ten-digit data | unit-digit data |

In one embodiment, the write controller 30 is further configured for writing display data of each video frame into the buffer 40 line by line, and writing the time code value before a start line of the display data of the video frame when writing the time code value.

Figure 3:
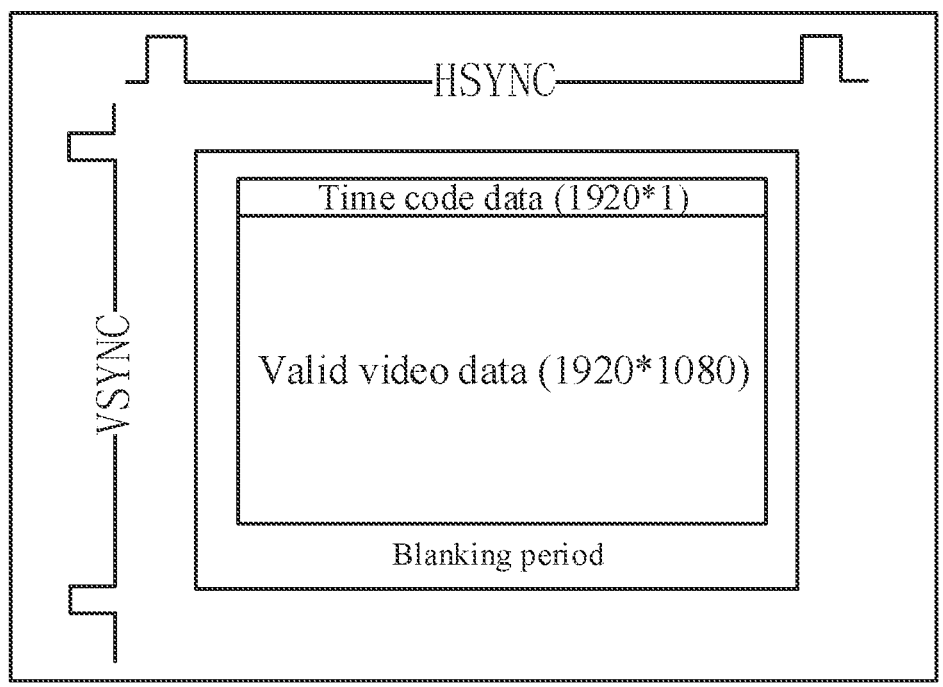
FIG. 3 shows the storage positions of a video frame and time code data in a buffer according to an embodiment of the disclosure.

Specifically, the storage positions of the time code data and the display data of the video frames in a memory are shown in FIG. 3, and the write controller 30 writes the video frames into the buffer 40 as a whole line by line according to the line information of the video frames. In order to write the video frames and the time code data together, the write controller 30 stores the time code data of the video frames in a position one line before valid data of the corresponding video frame. Specifically, if the size of the valid data of the video frame is 1920*1080*32, then the size of time code data is 1920*1*32, and the size of an address space allocated by the buffer 40 for one video frame and the corresponding time code data thereof is 1920*1081*32.

In one embodiment, an output frame rate of the read controller 60 is the same as an input frame rate of any video signal.

In this embodiment, as shown in FIG. 2, the time code display system may comprise four video receiving units, namely a first video receiving unit SDI1, a second video receiving unit SDI2, a third video receiving unit SDI3 and a fourth video receiving unit SDI4, which are configured for receiving four input video signals respectively, i.e., a first video signal, a second video signal, a third video signal and a fourth video signal. The output frame rate of the read controller 60 may be the same as the input frame rate of any video signal, Specifically, the synchronous clock component 50 is connected with one of the video receiving units 11, and is configured to generate a local clock signal according to a channel associated clock signal of a video signal received by the video receiving unit 11, so that the read controller 60 performs read-out operation according to the local clock signal, and then the output frame rate of the read controller 60 may be made the same as the input frame rate of the video signal received by the video receiving unit 11.

In one embodiment, as shown in FIG. 2, the synchronous clock component 50 comprises a synchronization unit 51, a clock domain conversion unit 52 and a timing generation unit 53, wherein the synchronization unit 51 is configured for generating a frame synchronization pulse signal of a channel associated clock domain according to the channel associated clock signal of any video signal; the clock domain conversion unit 52 is connected with the synchronization unit 51 and configured for converting the frame synchronization pulse signal of the channel associated clock domain into a frame synchronization pulse signal of a local dock domain; and the timing generation unit 53 is connected with the clock domain conversion unit 52 and configured for converting the frame synchronization pulse signal of the local clock domain into a local clock signal. For example, if the output frame rate of the read controller 60 is the same as the input frame rate of the first video signal, the synchronization unit 51 is connected with the first video receiving unit SDI1 and converts a timing signal (specifically refers to a frame synchronization signal) of the first video signal into a frame synchronization pulse signal, the clock domain conversion unit 52 converts the frame synchronization pulse signal of a clock domain of the first video signal into a frame synchronization pulse signal of a local clock domain, and the timing generation unit 53 converts the frame synchronization pulse signal of the local clock domain into a local clock signal, so that the read controller 60 reads the video signals of the buffer 40 and the corresponding time code data according to the local clock signal.

Further, the synchronous clock component 50 also detects whether each video receiving unit 11 has a signal input. When the first video signal has no signal input, the output frame rate of the read controller 60 may be configured to be the same as the input frame rate of the second video signal. When neither the first video signal nor the second video signal has a signal input, the output frame rate of the read controller 60 may be configured to be the same as the input frame rate of the third video signal. When none of the first video signal, the second video signal and the third video signal have a signal input, the output frame rate of the read controller 60 may be configured to be the same as the input frame rate of the fourth video signal.

When the synchronous clock component 50 detects that no video signal is input into the video receiver 10, display data of a preset display picture are read according to standard timing. That is, if no video receiving unit 11 has a signal input, the read controller 60 reads the display data of the preset display picture according to the standard timing. The preset display picture may be "no signal", etc. Of course, a user can also set the display data of the preset display picture as required.

In one embodiment, the read controller 60 is further configured for, when reading out the other video signals from the buffer 40, performing frame copy operation on the other video signals if an input frame rate of the other video signals is less than the output frame rate of the read controller 60; or performing frame dropping operation on the other video signals if the input frame rate of the other video signals is greater than the output frame rate of the read controller 60.

Figure 4:
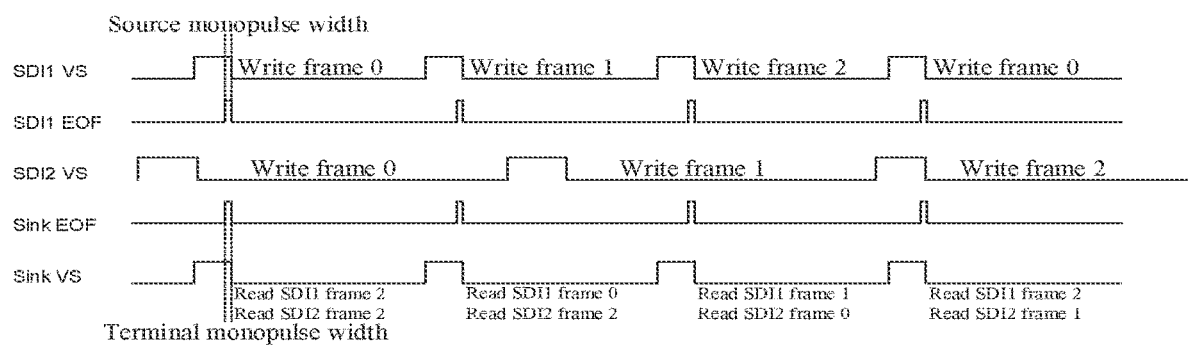
FIG. 4 is a frame copy processing mechanism provided according to an embodiment of the disclosure.
Figure 5:
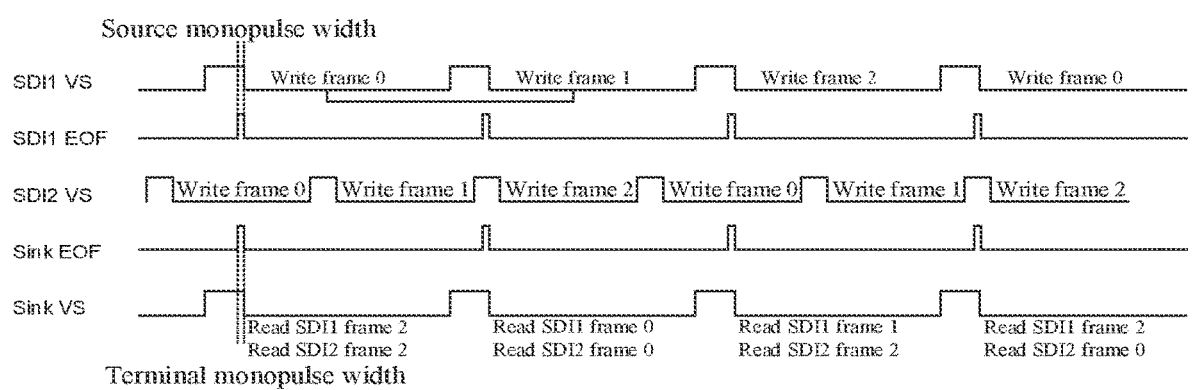
FIG. 5 is a frame dropping processing mechanism provided according to an embodiment of the disclosure.

Specifically, when reading out the video signal from the buffer 40, the read controller 60 always reads out the latest written complete video frame. For example, as shown in FIG. 4, in this embodiment, the output frame rate of the read controller 60 is configured to be the same as the input frame rate of the first video signal. SDI1 VS is a frame synchronization pulse signal of the first video signal, SDI1 EOF is a frame end flag bit of the first video signal, sink VS is a frame synchronization pulse signal of an output terminal, and sink EOF is a frame end flag bit of the output terminal. It can be seen from FIG. 4 that the frame synchronization pulse signal of the read controller 60 is the same as the frame synchronization pulse signal of the first video signal, that is, an output frame rate of the output terminal is the same as the input frame rate of the first video signal. SDI2 VS represents a frame synchronization pulse signal of the second video signal. As can be seen from FIG. 4, the input frame rate of the second video signal is smaller than the output frame rate of the read controller 60. In the first reading operation, the second video signal writes frame 0, and since frame 0 is not completely written, the read controller 60 reads out the latest written complete video frame of the second video signal, that is frame 2, the previous frame of frame 0. In the next reading operation, because the second video signal has not finished writing frame 0, the read controller 60 continues to read frame 2 of the second video signal; therefore, the output frame rates of the second video signal and the first video signal are kept synchronous by performing the frame copy operation on the second video signal. When the input frame rate of the third video signal and the input frame rate of the fourth video signal are less than the output frame rate of the read controller 60, the same operation is performed on the third video signal and the fourth video signal. As shown in FIG. 5, when the input frame rate of the second video signal is greater than the output frame rate of the read controller 60, the read controller 60 performs frame dropping operation on the second video signal when reading out the second video signal, so that the output frame rate of the second video signal is the same as that of the first video signal. The principle of the frame dropping operation is similar to the principle of the frame copy operation, as long as the read controller 60 always reads out the complete video frame latest written into the buffer 40. When the input frame rates of the third video signal and the fourth video signal are less than the output frame rate of the read controller 60, the same frame dropping operation is performed on the third video signal and the fourth video signal, so that the output four video signals have the same frame rate and the video viewing effect is improved.

In one embodiment, as shown in FIG. 2, the time code display system further comprises an OSD menu generation component 80, a superposition component 90 and a video output component 100, wherein the OSD menu generation component 80 is connected with the read controller 60 and configured for generating OSD menu data according to the time code data, the superposition component 90 is connected with the read controller 60 and the OSD menu generation component 80 and configured for generating a superposition picture of a video frame picture and the time code data according to the video frame and the OSD menu data, and the video output component 100 is connected with the superposition component 90 and the display 70 and configured for outputting the superposition picture to the display 70.

Specifically, as shown in FIG. 2, in this embodiment, the OSD menu generation component 80 comprises a plurality of OSD menu generation units 81, each OSD menu generation unit 81 is connected with the read controller 60, and each OSD menu generation mit 81 is configured for receiving the time code data of one video signal and generating corresponding OSD menu data according to the time code data of each video signal. The superposition component 90 is connected with each OSD menu generation unit 81 and the read controller 60 of each channel. The superposition component 90 superposes the video frame of each video signal and the corresponding OSD menu data to form four superposition pictures. The video output component 100 outputs the four superposition pictures to the display 70 according to a preset arrangement.

In one embodiment, the time code display system further comprises a bus arbitration component 110 and a read-write controller 120, wherein one end of the bus arbitration component 110 is connected with the read controller 60 and the write controller 30, and the bus arbitration component 110 is configured for receiving a write data request sent by the write controller 30 or a read control request sent by the read controller 60 and coordinating the write control request with the read control request. Specifically, the bus arbitration component 110 is connected with each write control unit 31, and coordinates the write control request of each write control unit 31 with the read control request sent by the read controller 60 to avoid read-write conflict. If the read control request and the write control request appear at the same time, the bus arbitration component 110 may preferentially respond to the write control request. One end of the read-write controller 120 is connected with the other end of the bus arbitration component 110, the other end of the read-write controller 120 is connected with the buffer 40, and the read-write controller 120 is configured for controlling the buffer 40 to write data according to the write control request or reading data from the buffer 40 according to the read control request.

In the time code display system provided in the above embodiment, the video receiver is configured for receiving the multiple non-homologous video signals, the time code parser is configured for extracting time code data of each video frame from each video signal, the write controller is configured for writing each video frame in each video signal and corresponding time code data into the buffer, the synchronous clock component is configured for generating the local clock signal according to the channel associated clock signal of any video signal, and the read controller is configured for synchronously reading out the video frame of each video signal and the time code data corresponding to the video frame from the buffer according to the local clock signal, so that the display performs superposition display on the video frame of each video signal and the time code data corresponding to the video frame. In this way, the video frames and the time code data are written into the buffer together, and the time code data corresponding to the video frames is read out synchronously when the video frames are read out on an output side, so that the video frames are strictly consistent with the time code data, and the consistency between the time code data and the video frames is ensured whether the frames are dropped or copied on the output side.

In addition, another embodiment of the application provides displaying device, comprising the above time code display system.

According to the displaying device, by writing video frames and time code data into a buffer together using the above time code display system, the time code data corresponding to the video frames is read out synchronously when the video frames are read out on an output side, so that the video frames are strictly consistent with the time code data, and the consistency between the time code data and the video frames is ensured whether the frames are dropped or copied on the output side.

Figure 6:
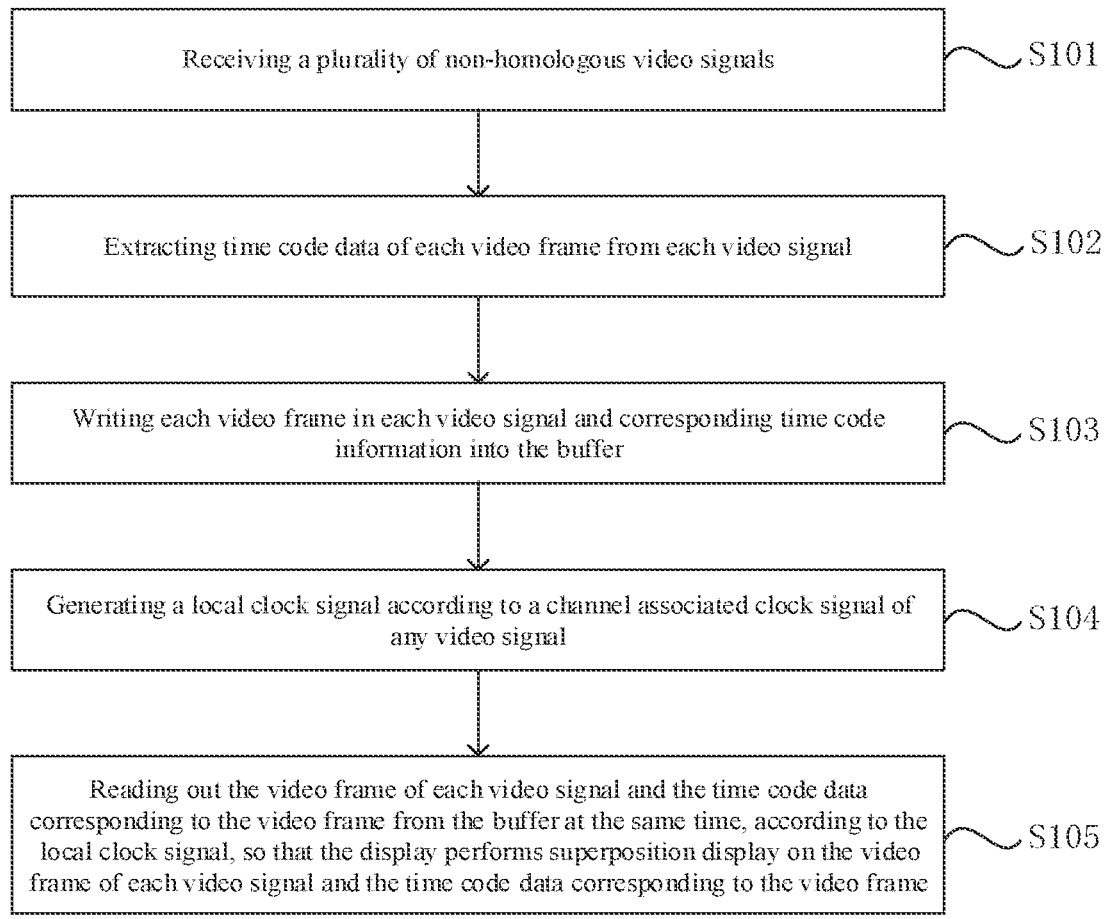
FIG. 6 is a flowchart of a time code display method provided according to an embodiment of the disclosure.

As shown in FIG. 6, another embodiment of the application provides a time code display method, which may be executed by the above time code display system, and the method comprises the following steps:

S101, receiving multiple non-homologous video signals;

S102, extracting time code data of each video frame from each video signal;

S103, writing each video frame in each video signal and corresponding time code data into the buffer;

S104, generating a local clock signal according to a channel associated clock signal of any video signal; and S105, synchronously reading out the video frame of each video signal and the time code data corresponding to the video frame from the buffer according to the local clock signal, so that the display performs superposition display on the video frame of each video signal and the time code data corresponding to the video frame.

It should be noted that one may refer to the description of the time code display system in this application for the description of the time code display method in this application, which will not be repeated here.

In the above time code display method, by receiving the multiple non-homologous video signals, extracting time code data of each video frame from each video signal, writing each video frame in each video signal and corresponding time code data into the buffer, generating the local clock signal according to the channel associated clock signal of any video signal, and synchronously reading out the video frame of each video signal and the time code data corresponding to the video frame from the buffer according to the local clock signal, the display performs superposition display on the video frame of each video signal and the time code data corresponding to the video frame, the video frames and the time code data are written into the buffer together, and the time code data corresponding to the video frames is read out synchronously when the video frames are read out on an output side, so that the video frames are strictly consistent with the time code data, and the consistency between the time code data and the video frames is ensured whether the frames are dropped or copied on the output side.

In addition, another embodiment of the application provides a computer readable storage medium having a time code display program stored thereon, wherein when the computer readable storage medium is executed by a processor, the above time code display method is implemented.

According to the computer readable storage medium of the embodiment of the disclosure, by writing video frames and time code data into a buffer together using the above time code display method, the time code data corresponding to the video frames is read out synchronously when the video frames are read out on an output side, so that the video frames are strictly consistent with the time code data, and the consistency between the time code data and the video frames is ensured whether the frames are dropped or copied on the output side.

In addition, another embodiment of the application provides electronic apparatus, which comprises a memory, a processor and a time code display program stored in the memory and operable on the processor, and when the processor executes the time code display program, the above time code display method is implemented.

According to the electronic apparatus of the embodiment of the disclosure, by writing video frames and time code data into a buffer together using the above time code display method, the time code data corresponding to the video frames is read out synchronously when the video frames are read out on an output side, so that the video frames are strictly consistent with the time code data, and the consistency between the time code data and the video frames is ensured whether the frames are dropped or copied on the output side.

It should be noted that the logic and/or steps shown in the flowchart or described in other ways here, for example, may be regarded as a sequence list of executable instructions for realizing logic functions, which may be embodied in any computer readable medium for use by or in combination with instruction execution systems, devices or equipment (such as computer-based systems, systems including processors or other systems that can fetch and execute instructions from instruction execution systems, devices or equipment). In this specification, "computer readable medium" may be any device that may contain, store, communicate, propagate or transmit programs for use by or in connection with instruction execution systems, devices or equipment. More specific examples (non-exhaustive list) of the computer readable medium include the following: an electrical connection part with one or more wires (electronic device), a portable computer cartridge (magnetic device), a random access memory (RAM), a read-only memory (ROM), an erasable and editable read-only memory (EPROM or flash memory), an optical fiber device, and a portable compact disc read-only memory (CDROM). In addition, the computer readable medium may even be paper or other suitable media on which the program can be printed, because the program may be obtained electronically, for example, by optically scanning the paper or other media, followed by editing, interpreting or processing in other suitable ways if necessary, and then stored in a computer memory.

Figure 7:
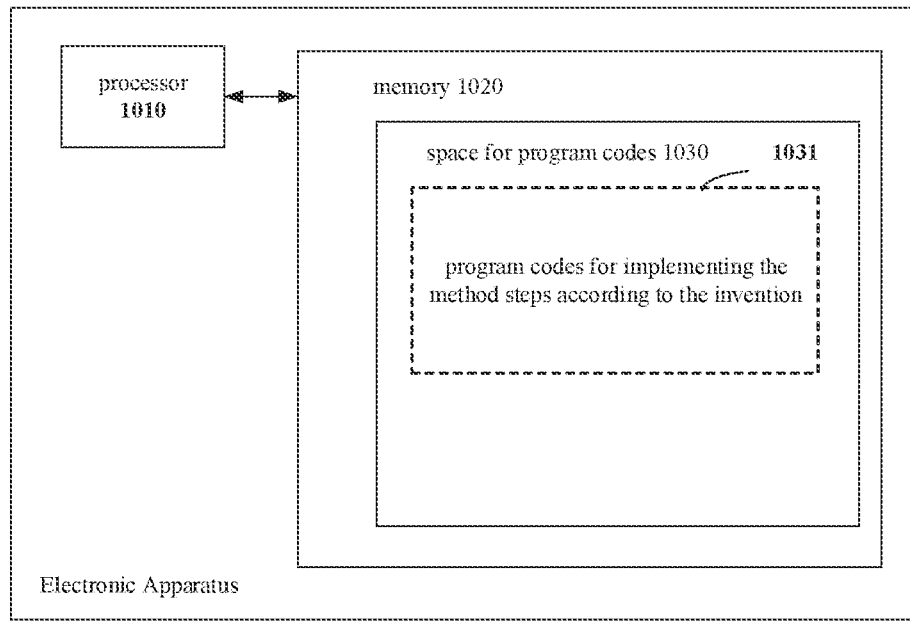
FIG. 7 schematically shows a block diagram of electronic apparatus for executing the method according to the disclosure.
Figure 8:
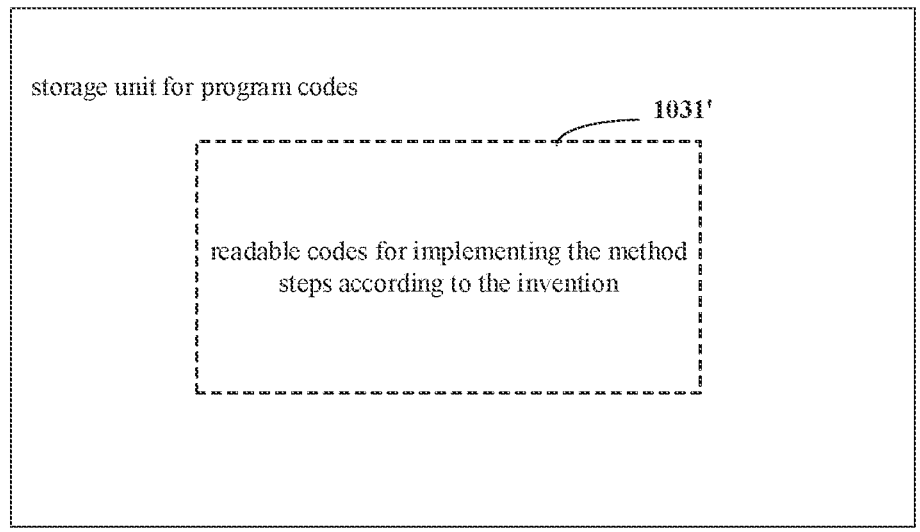
FIG. 8 schematically shows a storage unit for holding or carrying program codes for implementing the method according to the disclosure.

For example, FIG. 7 shows an electronic apparatus that can implement the method according to the disclosure. The electronic apparatus conventionally comprises a processor 1010 and a computer program product or computer readable medium in the form of a memory 1020. The memory 1020 may be an electronic memory such as flash memory, Electrically Erasable Programmable Read-Only Memory (EEPROM), EPROM, hard disk or ROM. The memory 1020 has a storage space 1030 for program codes 1031 for executing any step in the above method. For example, the storage space 1030 for the program codes may include various program codes 1031 for implementing the various steps in the above method. These program codes can be read from or written into one or more computer program products. These computer program products include program code carriers such as hard disk, compact disk (CD), memory card or floppy disk. Such a computer program product is usually a portable or fixed storage unit as described with reference to FIG. 8. The memory unit may have memory segments, memory spaces, and the like arranged similarly to the memory 1020 in the electronic apparatus of FIG. 7. The program codes can be compressed in an appropriate form, for example. Generally, the storage unit comprises computer readable codes 1031', i.e., codes readable by, for example, a processor such as 1010, which, when nm by the electronic apparatus, cause the electronic apparatus to implement the various steps in the method described above.

It should be understood that various portions of the disclosure may be implemented in hardware, software, firmware, or a combination thereof. In the above embodiments, a plurality of steps or methods may be implemented by software or firmware stored in a memory and executed by a suitable instruction execution system. For example, if they are implemented by hardware, as in another embodiment, they may be implemented by any one or a combination of the following technologies known in the art: discrete logic circuits with logic gates for implementing logic functions on data signals, application specific integrated circuits with appropriate combinational logic gates, programmable gate arrays (PGA), field programmable gate arrays (FPGA), etc.

In the description of this specification, descriptions referring to the terms "one embodiment", "some embodiments", "example". "specific example", or "some examples" mean that specific features, structures, materials or characteristics described in connection with this embodiment or example are included in at least one embodiment or example of this disclosure.

In this specification, the schematic expression of these terms does not necessarily refer to the same embodiment or example. Furthermore, the specific features, structures, materials or characteristics described may be combined in any one or more embodiments or examples in a suitable manner.

In addition, the terms "first" and "second" are only configured for descriptive purposes, and cannot be understood as indicating or implying relative importance or implicitly indicating the number of indicated technical features. Therefore, the features defined with "first" and "second" may include one or more of the features explicitly or implicitly. In the description of this disclosure, "multiple" means at least two, such as two, three, etc., unless otherwise specifically defined.

In the disclosure, unless otherwise specified and defined, the terms "install", "connect" and "fix" should be understood in a broad sense. For example, it can be fixed connection, detachable connection or integrated connection; it can be mechanical connection or electric connection; and it can be direct connection, indirect connection through intermediate media or internal communication or interaction of two elements, unless otherwise explicitly defined. For those of ordinary skill in the art, the specific meaning of the above terms in the disclosure can be understood in specific situations.

Although the embodiments of the disclosure have been shown and described above, it can be understood that the above-mentioned embodiments are exemplary and cannot be understood as limiting the disclosure, and those of ordinary skill in the art can make changes, modifications, substitutions and variations to the above-mentioned embodiments within the scope of the disclosure.

The invention claimed is:

1. A time code display system, comprising:
a video receiver configured for receiving a plurality of non-homologous video signals;
a time code parser connected with the video receiver and configured for extracting time code data of each video frame from each video signal;
a write controller and a buffer, the write controller being connected with the video receiver and the time code parser, and the write controller being configured for writing each video frame in each video signal and corresponding time code data into the buffer;
a synchronous clock component connected with the video receiver and configured for generating a local clock signal according to a channel associated clock signal of any video signal; and
a read controller and a display, the read controller being connected with the synchronous clock component and the buffer and configured for reading out the video frame of each video signal and the time code data corresponding to the video frame from the buffer at the same time, according to the local clock signal, so that the display performs superposition display on the video frame of each video signal and the time code data corresponding to the video frame;
an output frame rate of the read controller is the same as an input frame rate of any video signal;
wherein the read controller is further configured for, when reading out other video signals from the buffer,
performing frame copy operation on the other video signals if an input frame rate of the other video signals is less than the output frame rate of the read controller; or
performing frame dropping operation on the other video signals if the input frame rate of the other video signals is greater than the output frame rate of the read controller.

2. The time code display system according to claim 1, wherein clock domains of the plurality of the non-homologous video signals are not completely the same, and the write controller is further configured for writing each video frame in the corresponding video signal and the time code data thereof into the buffer under the clock domain of each said video signal.

3. The time code display system according to claim 2, wherein the time code data comprise a time code state and a time code value, and the write controller is further configured for reading the time code value from the time code parser when it is detected that the time code state is a valid state.

4. The time code display system according to claim 3, wherein the write controller is further configured for writing display data of each video frame into the buffer line by line, and writing the time code value before a start line of the display data of the video frame when writing the time code value.

5. The time code display system according to claim 1, wherein the synchronous clock component comprises:
a synchronization unit configured for generating a frame synchronization pulse signal of a channel associated clock domain according to the channel associated clock signal of any video signal;
a clock domain conversion unit connected with the synchronization unit and configured for converting the frame synchronization pulse signal of the channel associated clock domain into a frame synchronization pulse signal of a local clock domain; and
a timing generation unit connected with the clock domain conversion unit and configured for converting the frame synchronization pulse signal of the local clock domain into the local clock signal.

6. The time code display system according to claim 1, wherein the read controller is further configured for reading display data of a preset display picture according to standard timing when it is detected, by the synchronous clock component, that no video signal is input into the video receiver.

7. The time code display system according to claim 1, further comprising an OSD menu generation component connected with the read controller, wherein the OSD menu generation component is configured for generating OSD menu data according to the time code data, so that the read controller controls the display to display the OSD menu data.

8. The time code display system according to claim 7, further comprising a superposition component and a video output component, wherein
the superposition component is connected with the read controller and the OSD menu generation component, and configured for generating a superposition picture of a video frame picture and the time code data according to the video frame and the OSD menu data; and
the video output component is connected with the superposition component, and configured for outputting the superposition picture.

9. The time code display system according to claim 1, wherein the video receiver comprises a plurality of video receiving units, and each said video receiving unit is configured for receiving a video signal;
the time code parser comprises a plurality of time code analysis units, each said time code analysis unit is connected with one said corresponding video receiving unit, and each said time code analysis unit is configured for extracting time code data corresponding to each video frame from the corresponding video signal; and
the write controller comprises a plurality of write control units, each said write control unit is connected with one said corresponding video receiving unit and one said corresponding time code analysis unit, and each said write controller is configured for writing the video frame in the corresponding video signal and the corresponding time code data into the buffer.

10. The time code display system according to claim 1, further comprising a bus arbitration component and a read-write controller, wherein
one end of the bus arbitration component is connected with the read controller and the write controller, and the bus arbitration component is configured for receiving a write data request sent by the write controller or a read control request sent by the read controller and coordinating the write control request with the read control request; and
one end of the read-write controller is connected with another end of the bus arbitration component, another end of the read-write controller is connected with the buffer, and the read-write controller is configured for controlling the buffer to write data according to the write control request or reading data from the buffer according to the read control request.

11. A displaying device, comprising the time code display system according to claim 1.

12. A time code display method, comprising:
receiving a plurality of non-homologous video signals;
extracting time code data of each video frame from each video signal;
writing each video frame in each video signal and corresponding time code data into the buffer;
generating a local clock signal according to a channel associated clock signal of any video signal; and
reading out the video frame of each video signal and the time code data corresponding to the video frame from the buffer at the same time by a read controller, according to the local clock signal, so that the display performs superposition display on the video frame of each video signal and the time code data corresponding to the video frame;
an output frame rate of the read controller is the same as an input frame rate of any video signal;
wherein when reading out other video signals from the buffer,
performing frame copy operation on the other video signals if an input frame rate of the other video signals is less than the output frame rate of the read controller; or
performing frame dropping operation on the other video signals if the input frame rate of the other video signals is greater than the output frame rate of the read controller.

13. A non-transitory computer readable storage medium, having a time code display program stored thereon, wherein when the non-transitory computer readable storage medium is executed by a processor, the time code display method according to claim 12 is implemented.

14. An electronic apparatus, comprising a memory, a processor, and a time code display program stored in the memory and operable on the processor, wherein when the processor executes the time code display program, the time code display method according to claim 12 is implemented.

* * * * *